US012578847B2

(12) United States Patent
Hazan et al.

(10) Patent No.: US 12,578,847 B2
(45) Date of Patent: Mar. 17, 2026

(54) SECURE SCREEN RENDERING WITH ACCESSIBILITY DATA

(71) Applicant: Digital.ai Software, Inc., Raleigh, NC (US)

(72) Inventors: Ariel Mordecai Hazan, Ashdod (IL); Arundoss Samuel Selvadoss, Chennai (IN); Khaled Abbas, Kfar Kana (IL); Ortal Tenenboum, Rosh Ha'Ein (IL)

(73) Assignee: Digital.ai Software, Inc., Raleigh, NC (US)

( * ) Notice: Subject to any disclaimer, the term of this patent is extended or adjusted under 35 U.S.C. 154(b) by 184 days.

(21) Appl. No.: 18/392,466

(22) Filed: Dec. 21, 2023

(65) Prior Publication Data

US 2025/0208757 A1 Jun. 26, 2025

(51) Int. Cl.
*G06F 3/04845* (2022.01)
*G06T 11/60* (2006.01)

(52) U.S. Cl.
CPC .......... *G06F 3/04845* (2013.01); *G06T 11/60* (2013.01); *G06T 2200/24* (2013.01)

(58) Field of Classification Search
CPC ...... G06F 3/04845; G06F 9/451; G06T 11/60; G06T 2200/24
See application file for complete search history.

(56) References Cited

U.S. PATENT DOCUMENTS

| | | | | |
|---|---|---|---|---|
| 7,349,893 | B2 * | 3/2008 | McKeon | G06F 16/9024 |
| | | | | 707/999.005 |
| 10,884,586 | B2 * | 1/2021 | Garg | G06F 3/04842 |
| 11,409,546 | B2 * | 8/2022 | Barrett | G06N 5/01 |
| 12,353,380 | B2 * | 7/2025 | Dean | G06F 3/016 |
| 2005/0246326 | A1 * | 11/2005 | McKeon | G06F 16/9024 |
| 2007/0234308 | A1 * | 10/2007 | Feigenbaum | G06F 8/316 |
| | | | | 717/130 |
| 2012/0331411 | A1 * | 12/2012 | Dempsey | G06F 3/048 |
| | | | | 715/764 |
| 2018/0329590 | A1 * | 11/2018 | Garg | G06F 3/04842 |
| 2021/0216333 | A1 * | 7/2021 | Barrett | G06N 3/08 |
| 2023/0185909 | A1 * | 6/2023 | Dean | G06F 8/20 |
| | | | | 726/23 |
| 2025/0147720 | A1 * | 5/2025 | Panwar | G06F 3/167 |

* cited by examiner

*Primary Examiner* — Kenny Nguyen
(74) *Attorney, Agent, or Firm* — Gilliam IP PLLC

(57) ABSTRACT

A cloud-based secure screen rendering engine ("rendering engine") receives accessibility data from devices running software-as-a-service ("SaaS") applications with secure screen settings enabled. The rendering engine filters elements in the accessibility data that are not displayed on-screen. From the filtered elements, the rendering engine identifies hierarchical relationships between elements from the accessibility data and renders the secure screen according to the accessibility data and hierarchical relationships. This methodology for secure screen rendering allows rendering of secure screens external to the devices where secure screen data is typically not accessible.

20 Claims, 4 Drawing Sheets

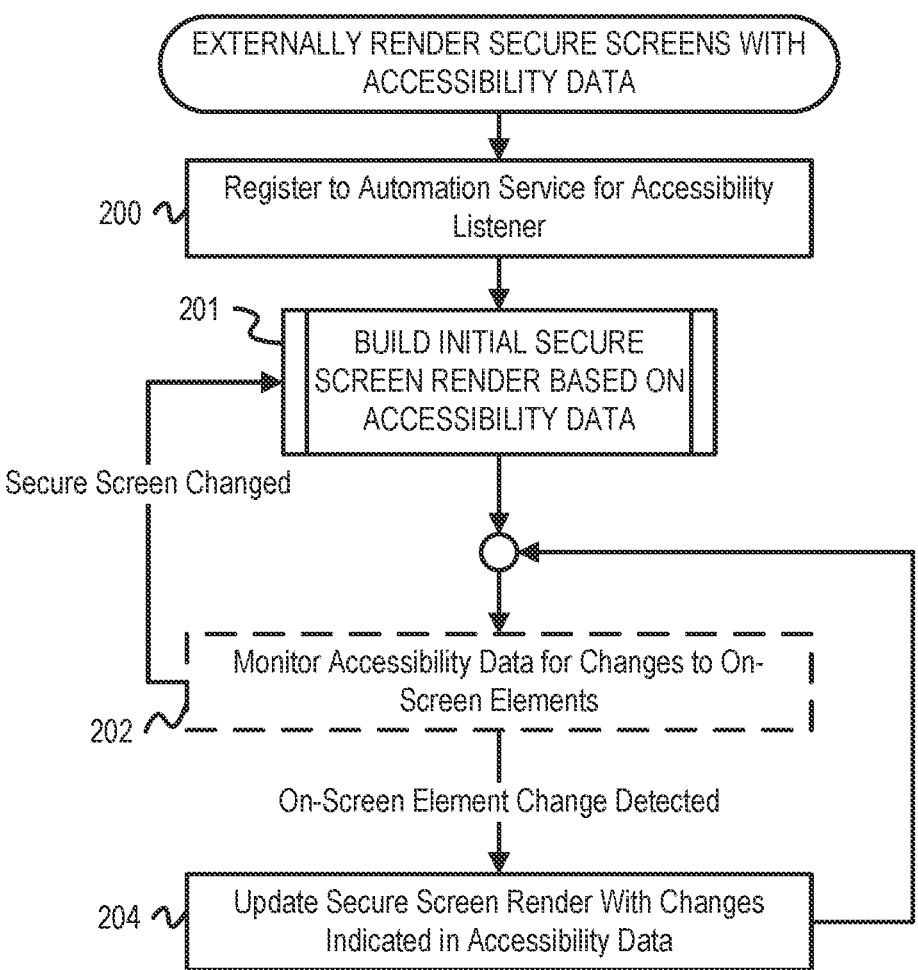

EXTERNALLY RENDER SECURE SCREENS WITH ACCESSIBILITY DATA

200 — Register to Automation Service for Accessibility Listener

201 — BUILD INITIAL SECURE SCREEN RENDER BASED ON ACCESSIBILITY DATA

Secure Screen Changed

202 — Monitor Accessibility Data for Changes to On-Screen Elements

On-Screen Element Change Detected

204 — Update Secure Screen Render With Changes Indicated in Accessibility Data

FIG. 2

SECURE SCREEN RENDERING WITH ACCESSIBILITY DATA

BACKGROUND

The disclosure generally relates to computing arrangements based on electric digital data processing (e.g., CPC subclass G06F) and data structures of image data (e.g., CPC subclass G06F 16/40).

Devices with displays, especially mobile devices, have secure screen settings that prevent external collection of data displayed on the secure screens. These secure screen settings can be enabled for certain software-as-a-service ("SaaS") applications, for instance SaaS applications that frequently display sensitive user data such as applications offered by financial services, streaming services, e-commerce services, etc. SaaS applications with secure screen settings, and more generally any SaaS applications that generate user displays, have accessibility settings. The accessibility settings enable generation of accessibility data that describe locations and attributes of on-screen elements so that the devices can generate annotations to visually dictate screen display descriptions to visually impaired users.

BRIEF DESCRIPTION OF THE DRAWINGS

Embodiments of the disclosure may be better understood by referencing the accompanying drawings.

FIG. 2 is a flowchart of example operations for externally rendering secure screens with accessibility data.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

Vendors performing testing of SaaS applications on mobile devices can face problems due to secure screen settings of certain SaaS applications that restrict viewing of a display to the device itself. Conversely, the vendors may be running automated tests separately from the devices but still want to see secure screen displays. A cloud-based secure screen rendering engine ("rendering engine") disclosed herein leverages accessibility data to render secure screens for SaaS applications external to mobile devices where the SaaS applications are running. Based on detecting that a SaaS application running on a mobile device has a secure screen functionality enabled, the rendering engine prompts a user or service to enable accessibility settings on the mobile device and communicate accessibility data to the rendering engine. The rendering engine then receives accessibility data from the mobile device in the form of elements and metadata describing locations and properties of those elements on a screen display. The rendering engine filters, from the obtained elements, those elements not having the property that they are displayed on-screen and generates a secure screen render based on the location and properties of the on-screen elements. The rendering engine allows for automated testing of high volumes of mobile devices that have secure screen settings enabled.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

A "secure screen" as used herein refers to a screen display whose content is secure, i.e., whose content cannot be taken as a screenshot, cannot be rendered on external displays, and/or whose content cannot be communicated to external devices to the device with the secure screen without security permissions. Secure screens can correspond to secure activities for SaaS applications running on devices.

Example Illustrations

Figure 1:
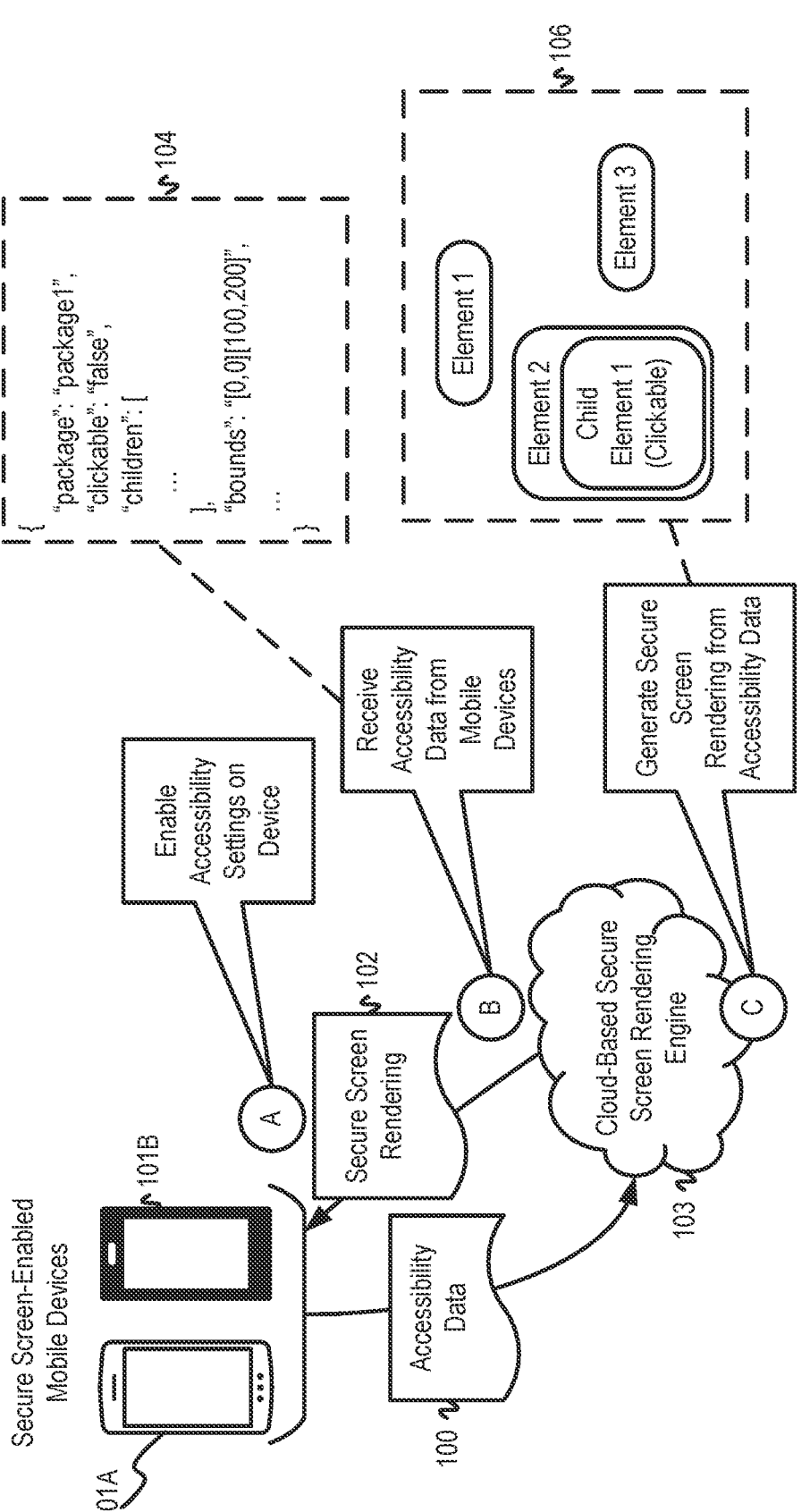
FIG. 1 is a schematic diagram of an example cloud-based secure screen rendering engine for externally rendering secure screens with accessibility data.

FIG. 1 is a schematic diagram of an example cloud-based secure screen rendering engine for externally rendering secure screens with accessibility data. A cloud-based secure screen rendering engine ("rendering engine") 103 provides automated rendering of secure screen elements at mobile devices provided by accessibility data for SaaS applications. FIG. 1 is annotated with a series of letters A-C. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, the rendering engine 103 detects mobile devices 101A, 101B that have secure screen settings enabled for one or more SaaS applications. For instance, for Android® mobile devices, the rendering engine 103 can determine whether a "FLAG_SECURE" flag is set. The rendering engine 103 can continuously monitor mobile devices across an organization to identify mobile devices that have secure screen settings enabled. For instance, the rendering engine 103 can receive telemetry data for SaaS application activity in the cloud and monitor the telemetry data for flags indicating secure screen settings are enabled. For each mobile device detected as having secure screen settings enabled (e.g., mobile devices 101A, 101B), the rendering engine 103 prompts a user or service of each mobile device to enable accessibility settings and communicate the accessibility data to the rendering engine 103, such as by sending a notification or request to the mobile devices. In other embodiments, the rendering engine can have remote access to the detected mobile devices and can itself enable accessibility settings. The accessibility data describes screen elements and functionality to visually impaired individuals. In some instances, the mobile devices 101A, 101B comprise mobile devices that are being tested by the rendering engine (e.g., testing corresponding SaaS applications running on the mobile devices) and not actively being operated by a user.

At stage B, the rendering engine 103 receives accessibility data 100 from the mobile devices 101A. 101B. The accessibility data comprises metadata for screen elements. Example metadata 104 comprises:

```
{
    "package": "package1",
    "clickable": "false",
    "children": [
        ...
    ],
    "bounds": "[0,0][100,200]",
    ...
}
```

Additional metadata can comprise a "hidden" field, a "checkable" field, a "knownSuperClass" field, an "index" field, a "focusable" field, a "dumpElementType" field, an "enabled" field, a "longClickable" field, an "onScreen" field, a "password" field, a "top" field, a "class" field, a "scrollable" field, a "selected" field, etc.

At stage C, the rendering engine 103 generates a secure screen render 102 from the accessibility data 100. An example secure screen render 106 comprises a first element in the top middle of the screen, a second element in the bottom left of the screen with a first child element that is clickable, and a third element in the bottom left of the screen, depicted in FIG. 1 as "Element 1," "Element 2," and "Element 3," respectively. The rendering engine 103 generates the secure screen render 102 according to metadata for each element indicated in the accessibility data 100. For instance, the rendering engine 103 can generate elements according to their bounds and any text indicated in the element metadata. Additional metadata fields such as a password Boolean, a clickable Boolean, etc. can cause the rendering engine 103 to generate a password text box, enable an element to be clickable with a hyperlink indicated in the metadata, etc.

The accessibility data 100 comprises elements with hierarchical structure wherein certain elements at higher levels of the hierarchical structure are not displayed or are covered by elements at lower hierarchical levels. The rendering engine 103 can filter metadata of elements in the accessibility data 100 that are not displayed and then render elements according to their hierarchical structure. As an example, the rendering engine 103 can filter out elements having an "onScreen" metadata field of "false." In some embodiments, the rendering engine 103 can identify elements at higher hierarchical levels that are covered on a display by elements at lower levels and filter those elements. Elements with certain classes that are not displayed can be additionally filtered. Once the elements are filtered, the rendering engine 103 first displays parent elements (i.e., elements that have sub-elements indicated in a "children" metadata field) and then superimposes any child elements of parent elements on top of the corresponding parent elements. The rendering engine 103, for each set of screen element data for a secure screen communicated in the accessibility data 100, can perform the filtering operation and then generate a hierarchical structure for the remaining elements. The rendering engine 103 can then generate the display by starting at a highest hierarchical level of the hierarchical structure, rendering those elements, traversing to lower hierarchical levels (e.g., with a tree traversal algorithm such as bread-first or depth-first search), and superimposing those elements at lower levels over those elements at higher levels. In some embodiments, the rendering engine 103 can filter out elements having a metadata field "top=true" because elements with "top=false" are displayed in the foreground. The rendering engine 103 can have an option that when enabled keeps elements with metadata field "top=true" and can indicate the option as displaying invisible elements. The rendering engine 103 can vary how the screen is rendered (e.g., relative offsets of each element according to their prescribed bounds) by operating system, resolution, by whether the secure screen render 102 is landscape or portrait, etc.

The rendering engine 103 can be a service provided to a third-party that is testing SaaS applications on mobile devices. The testing can occur in the cloud without manual access to mobile devices and thus the third-party may not have the capability of observing secure screens directly on the mobile devices. As such, the rendering engine 103 provides the capability of approximating the secure screens during testing so that the third-party can test secure screen data of the mobile devices from the cloud, enabling scalable secure screen-based SaaS application testing. Simulated secure displays can be provided to the third-party as renders or metadata for elements.

Figure 3:
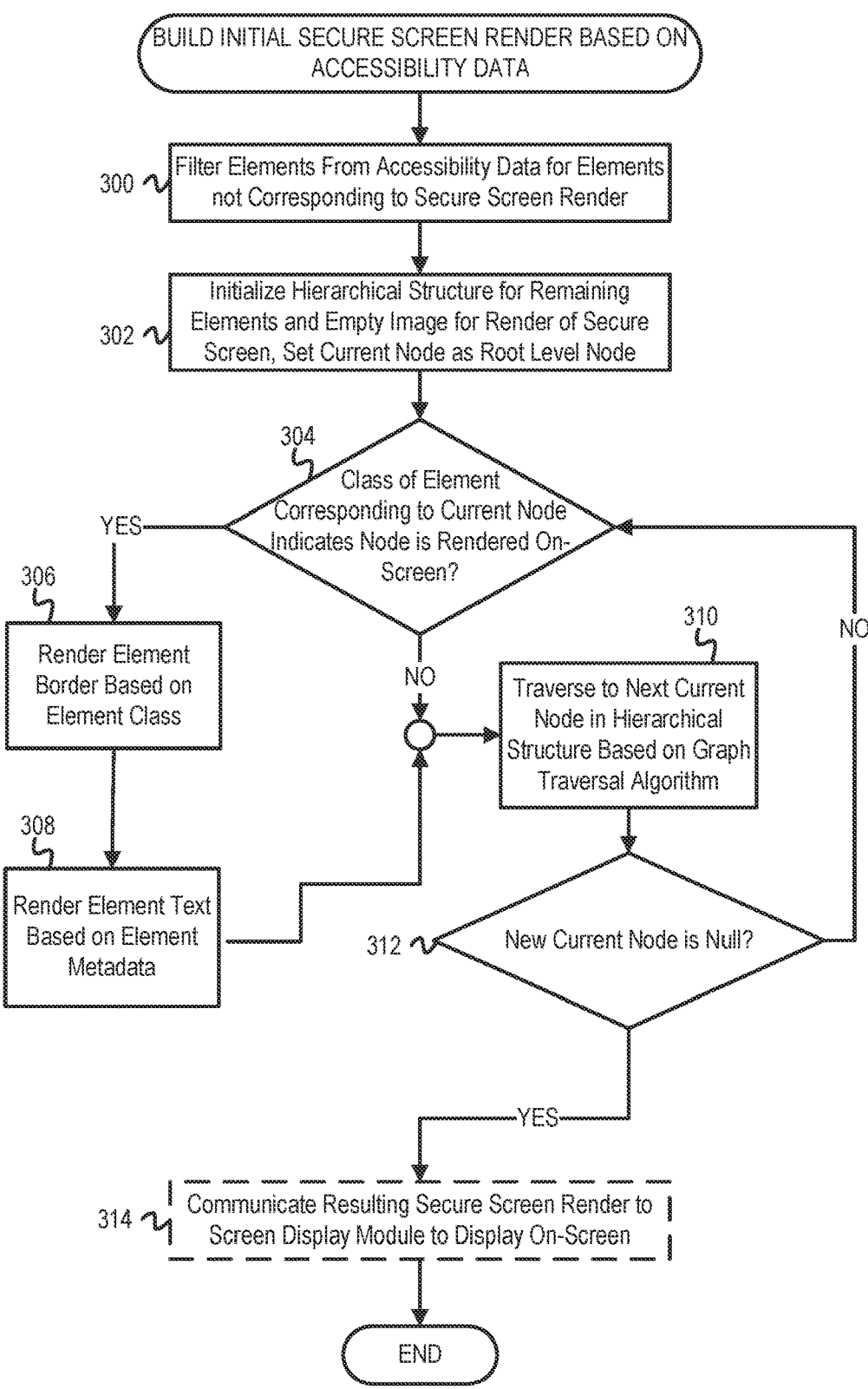
FIG. 3 is a flowchart of example operations for building an initial secure screen render with accessibility data.

FIGS. 2-3 are flowcharts of example operations for externally rendering secure screens by building secure screen renders based on accessibility data. The example operations are described with reference to cloud-based secure screen rendering engine ("rendering engine") for consistency with the earlier figure and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart of example operations for externally rendering secure screens with accessibility data. At block 200, the rendering engine registers to an automation service for an accessibility listener. The automation service can be a third-party service configured on mobile devices across an organization that automates enablement of accessibility data on SaaS applications and communication of accessibility data from the mobile devices to the rendering engine. In other embodiments, the rendering engine can prompt a user(s) to enable accessibility data for certain SaaS applications.

At block 201, the rendering engine builds an initial secure screen render based on the accessibility data. The rendering engine can wait for the automation service to collect a baseline amount of accessibility data prior to rendering the initial secure screen render. The operations at block 201 are described in greater detail in reference to FIG. 3.

At block 202, the rendering engine monitors the accessibility data for changes to on-screen elements. The accessibility data can comprise metadata for elements, and the rendering engine can inspect metadata fields to determine whether they indicate existing or new on-screen elements, e.g., by maintaining an index of currently rendered elements or determining whether an action metadata field indicates "TYPE_WINDOW_CONTENT_CHANGED" or "TYPE_VIEW_CLICKED". The rendering engine can determine whether a class field indicates a class of an element that is displayed on screen, whether an element is a child element of an existing rendered element, etc. If the rendering engine detects a change to an on-screen element, e.g., via a "TYPE_WINDOW_CONTENT_CHANGED" metadata field, operational flow proceeds to block 204. Changes to on-screen elements also include addition and deletion of subsets of on-screen elements without replacing the screen as a whole. Otherwise, if the rendering engine determines that the secure screen has changed, e.g., via a "TYPE_VIEW_CLICKED" metadata field, operational flow returns to block 201 to build a new initial secure screen render. If no changes are detected, the rendering engine continues to monitor the accessibility data for changes to on-screen elements. Block 202 is depicted with a dashed line to indicate that monitoring of the accessibility data continues until an external trigger (e.g., an administrator managing testing of a SaaS application across mobile devices) occurs.

At block 204, the rendering engine updates the secure screen render with changes indicated in the accessibility data. The rendering engine can determine whether the elements in the accessibility data are new on-screen elements or existing elements to be updated, as well as whether the elements are child elements of existing elements. The rendering engine updates the secure screen render by rendering the additional and/or updated elements according to corresponding metadata, for instance by rendering border elements, rendering element text, superimposing child elements onto parent elements, etc. Operational flow returns to block 202 to continue monitoring accessibility data for changed to on-screen elements and operations in FIG. 2 continue until an external trigger is satisfied.

FIG. 2 is depicted for a single secure screen render corresponding to a single mobile device. Alternatively, the rendering engine can maintain multiple secure screen renders for multiple mobile devices (e.g., across an organization) for which automated accessibility data is enabled by the automation service. The rendering engine can receive the accessibility data in a single data stream across the mobile devices and can inspect the accessibility data to determine whether elements correspond to existing secure screen renders or whether elements are for a new secure screen to render. Changes to secure screen renders can be detected per secure screen render. Moreover, multiple secure screen renders for each mobile device corresponding to multiple SaaS applications can be maintained by the rendering engine.

FIG. 3 is a flowchart of example operations for building an initial secure screen render with accessibility data. Although described for an initial secure screen render, many of the example operations can be applied to updating a secure screen render. For instance, elements in secure screen renders can be updated based on example operations for rendering element borders and rendering element text, and the hierarchical structure describing hierarchical relationships of elements can be updated as on-screen elements are updated. Hierarchical relationships in the hierarchical structure describe both parent-child relationships as well as relative depth in the hierarchy between elements.

At block 300, the rendering engine filters elements from the accessibility data not corresponding to a secure screen render. For instance, the rendering engine can filter elements corresponding to a different mobile device, elements not displayed on-screen, etc. The rendering engine may have established multiple data streams for multiple mobile devices and can filter elements from each data stream.

At block 302, the rendering engine initializes a hierarchical structure for remaining elements after the filtering operation and initializes an empty render of a secure screen corresponding to the accessibility data to populate with on-screen elements. The rendering engine sets the current node as a root level node. The root level node can comprise a node corresponding to an element with no parents. When there are multiple elements with no parents, the rendering engine can randomly select one of the corresponding nodes as the current node.

At block 304, the rendering engine determines whether a class of the element corresponding to the current node indicates that the element for the node is rendered on-screen.

For instance, for a secure screen of an Android mobile device, the rendering engine can determine whether the when the class of the node is "LinearLayout" or "Relative-Layout," then the element corresponding to the node is not rendered on-screen. Other metadata of the element can be used to determine whether the element is displayed on-screen, for instance based on the type of platform generating the accessibility data, the type of mobile device, etc. If the rendering engine determines the class of the element corresponding to the current node indicates the element is rendered on-screen, operational flow proceeds to block 306. Otherwise, operational flow proceeds to block 310.

At block 306, the rendering engine renders an element border for the element in the render of the secure screen corresponding to the current node based on the element class. At block 308, the rendering engine renders element text for the element in the render of the secure screen based on metadata for the element. The operations for rendering the element can vary based on type of the accessibility data. Some elements may not have element text or borders and may comprise other aspects such as solid or gradient filler, icons, alignment of text, text font/size, etc. indicated in the metadata. When the element corresponding to the current node has a parent element, the rendering engine superimposes the rendering of the child element onto the rendering of the parent element.

At block 310, the rendering engine traverses to a next current node in the hierarchical structure based on a graph traversal algorithm. The graph traversal algorithm can traverse parent nodes prior to traversing their child nodes (e.g., breadth-first search) so that elements corresponding to child nodes are rendered subsequent to elements corresponding to parent nodes. In this case, the rendering of elements of child nodes is superimposed onto the rendering of elements of parent nodes. At block 312, if the new current node is null, i.e., if the rendering engine has traversed all nodes in the hierarchical structure, operational Flow proceeds to block 314. Otherwise, operational flow returns to block 304.

At block 314, the rendering engine communicates the resulting secure screen render to a screen display module to display on-screen. Block 314 is depicted with dashed lines to reflect that this operation is optional, for instance when the rendering engine is facilitating cloud testing of SaaS applications running on mobile devices across an organization without explicit display of screen renders for each SaaS application on the devices themselves. In addition or alternative to communicating the resulting secure screen render to a screen display module, the rendering engine can communicate the secure screen render to a third-party testing service that is testing SaaS applications with secure screen settings enabling.

The rendering engine in FIG. 3 is described as maintaining a hierarchical structure of elements currently displayed on-screen. In some embodiments, the rendering engine can render and update renders of on-screen elements without maintaining this hierarchical structure, for instance when inferring hierarchical relationships between on-screen elements directly from accessibility data as it is detected/filtered.

Variations

Although described for mobile devices, the operations for rendering secure screens described above can be performed for any devices having a display with secure screen functionality. Secure screen rendering can occur anywhere external to the devices communicating the accessibility data and not solely in the cloud.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in reference to FIG. 2 be performed in parallel or concurrently across devices and across secure screens for distinct SaaS applications. With respect to FIG. 3, the operations at block 314 are not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 4:
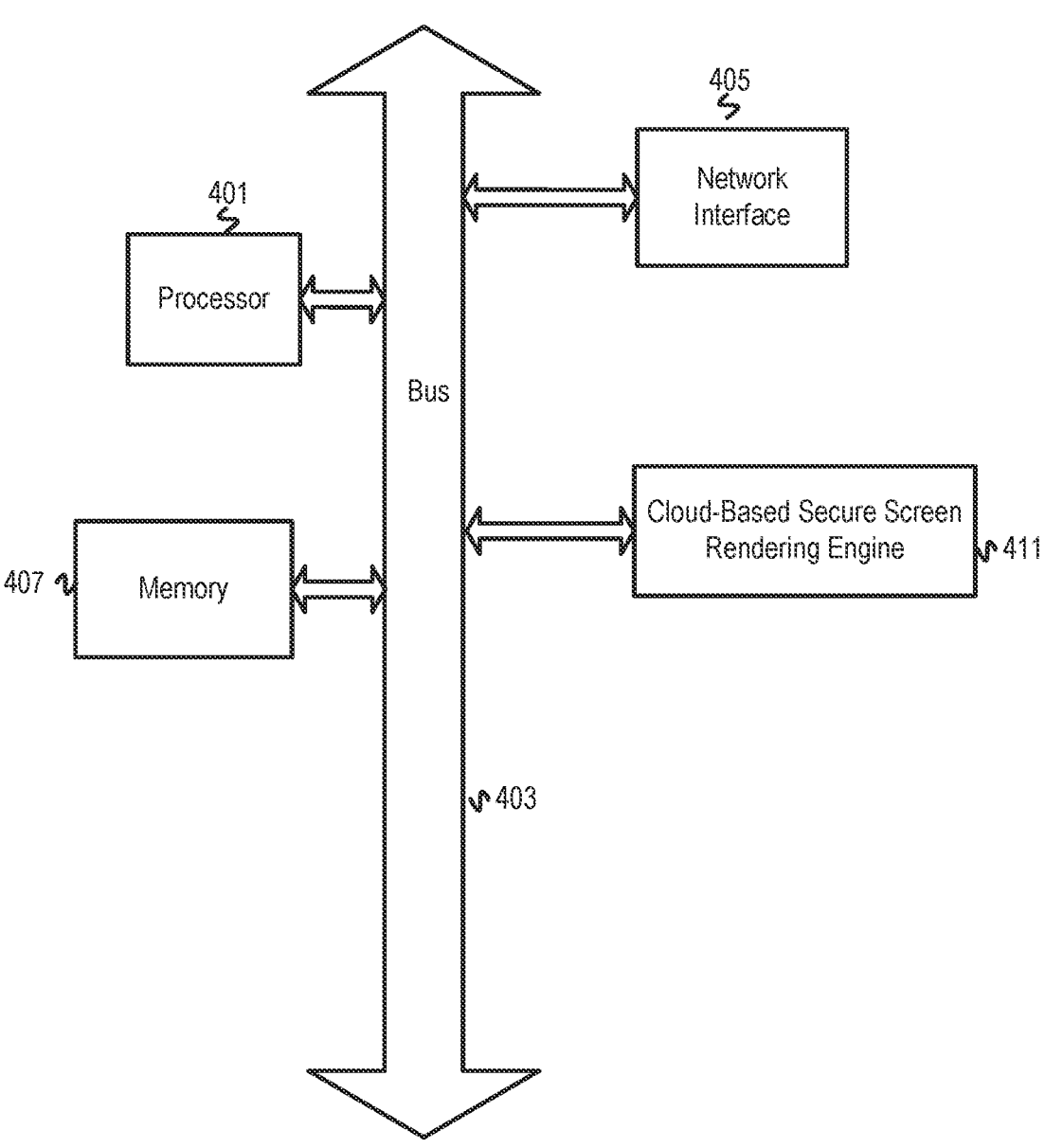
FIG. 4 depicts an example computer system with a cloud-based secure screen rendering engine.

FIG. 4 depicts an example computer system with a cloud-based secure screen rendering engine. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes a cloud-based secure screen rendering engine ("rendering engine") 411. The rendering engine 411 prompts devices to enable communication of accessibility data. Based on receiving the accessibility data, the rendering engine 411 filters on-screen elements not displayed on-screen, generates and maintains a hierarchical structure of hierarchical relationships between filtered elements, and renders and updates a secure screen render according to the hierarchical structure and metadata of the elements in the accessibility. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:

receiving first accessibility data for program code running on a first device, wherein the program code corresponds to a secure screen on the first device, wherein receiving the first accessibility data comprises receiving the first accessibility data by a second device external to the first device;

filtering the first accessibility data to identify a subset of the first accessibility data for one or more on-screen elements for the secure screen; and generating a render of the secure screen, wherein generating the render of the secure screen comprises, traversing the subset of the first accessibility data for the one or more on-screen elements according to a hierarchical structure of the one or more on-screen elements indicated in the subset of the first accessibility data; and at each element of the one or more on-screen elements in the traversal of the hierarchical structure, rendering the element according to accessibility data in the first accessibility data for the element.

2. The method of claim 1, further comprising generating the hierarchical structure according to hierarchical relationships between on-screen elements indicated in the subset of the first accessibility data for the one or more on-screen elements.

3. The method of claim 1, wherein rendering the element according to the accessibility data in the first accessibility data for the element and the hierarchical structure comprises:

determining that the element is a child element of a parent element in the one or more on-screen elements based on the hierarchical structure; and superimposing a render of the child element onto a render of the parent element in the render of the secure screen.

4. The method of claim 1, further comprising:

receiving second accessibility data for the secure screen;

determining that the second accessibility data indicates updating the render of the secure screen; and at least one of rendering additional elements and updating renders of elements in the one or more on-screen elements based on the second accessibility data and the hierarchical structure.

5. The method of claim 1, wherein rendering the element according to the accessibility data in the first accessibility data for the element and the hierarchical structure comprises at least one of rendering a border of the element and rendering text of the element, wherein parameters for the border of the element and parameters for the text of the element are indicated in the accessibility data.

6. The method of claim 1, wherein filtering the first accessibility data to identify the subset of the first accessibility data comprises filtering accessibility data from the first accessibility data for elements corresponding to classes not displayed on the secure screen.

7. The method of claim 1, further comprising registering to a service to receive the first accessibility data.

8. A non-transitory machine-readable medium having program code stored thereon, the program code comprising instructions to:

receive first accessibility data for program code running on a device, wherein the program code corresponds to a secure screen on the device, wherein the instructions to receive the first accessibility data comprise instructions to receive the first accessibility data external to the device;

filter the first accessibility data to identify a subset of the first accessibility data for one or more on-screen elements for the secure screen; and generate a render of the secure screen, wherein the instructions to generate the render of the secure screen comprise instructions to, iterate through the one or more on-screen elements in an order based, at least in part, on hierarchical relationships between the one or more on-screen elements indicated in the subset of the first accessibility data; and at each element in the one or more on-screen elements during the iteration, render the element according to accessibility data in the first accessibility data for the element.

9. The non-transitory machine-readable medium of claim 8, wherein the program code further comprises instructions generate a hierarchical structure according to hierarchical relationships between elements indicated in the subset of the first accessibility data.

10. The non-transitory machine-readable medium of claim 8, wherein the instructions to render the element according to the accessibility data in the first accessibility data for the element comprise instructions to:

determine that the element is a child element of a parent element in the one or more on-screen elements based on the hierarchical relationships; and superimpose a render of the child element onto a render of the parent element in the render of the secure screen.

11. The non-transitory machine-readable medium of claim 8, wherein the instructions to render the element according to the accessibility data in the first accessibility data for the element and the hierarchical relationships comprise instructions to at least one of render a border of the element and render text of the element, wherein parameters for the border of the element and parameters for the text of the element are indicated in the first accessibility data.

12. The non-transitory machine-readable medium of claim 8, wherein the program code further comprises instructions to:

receive second accessibility data for the secure screen;

determine that the second accessibility data indicates updating the render of the secure screen; and at least one of render additional elements and update renders of elements in the one or more on-screen elements based on the second accessibility data and the hierarchical relationships.

13. The non-transitory machine-readable medium of claim 8, wherein the instructions to filter the first accessibility data to identify the subset of the first accessibility data comprise instructions to filter accessibility data from the first accessibility data for elements corresponding to classes not displayed on the secure screen.

14. The non-transitory machine-readable medium of claim 8, wherein the program code further comprises instructions to register to a service to receive the first accessibility data.

15. An apparatus comprising:

a processor; and a non-transitory machine-readable medium having instructions stored thereon that are executable by the processor to cause the apparatus to, maintain a render of a secure screen based on a stream of accessibility data for program code running on an external device, wherein the instructions to maintain the render of the secure screen comprise instructions executable by the processor to cause the apparatus to:

receive the stream of accessibility data at an interface with the processor;

filter, from the stream of accessibility data, accessibility data that does not correspond to on-screen elements for the secure screen; and at least one of update the render of the secure screen and render the secure screen based on the filtered accessibility data based, at least in part, on metadata and hierarchical relationships between on-screen elements indicated in the stream of accessibility data.

16. The apparatus of claim 15, wherein the machine-readable medium further has stored thereon instructions executable by the processor to cause the apparatus to generate a hierarchical structure of elements in the secure screen according to hierarchical relationships indicated in the accessibility data.

17. The apparatus of claim 15, wherein the instructions to at least one of update the render of the secure screen and render the secure screen based on the filtered accessibility data comprise instructions executable by the processor to cause the apparatus to:

determine that an element is a child element of a parent element based on the hierarchical relationships; and superimpose a render of the child element onto a render of the parent element in the render of the secure screen.

18. The apparatus of claim 15, wherein the instructions to at least one of update the render of the secure screen and render the secure screen based on the filtered accessibility data comprise instructions executable by the processor to cause the apparatus to at least one of render borders of the elements and render text of elements indicated in the filtered accessibility data.

19. The apparatus of claim 15, wherein the instructions to filter, from the stream of accessibility data, accessibility data that does not correspond to on-screen elements for the secure screen comprise instructions executable by the processor to cause the apparatus to filter accessibility data from the stream of accessibility data for elements corresponding to classes not displayed on the secure screen.

20. The apparatus of claim 15, wherein the machine-readable medium further has stored thereon instructions executable by the processor to cause the apparatus to register to a service to receive the stream of accessibility data.

\* \* \* \* \*